UNITED STATES PATENT OFFICE 2,221,080

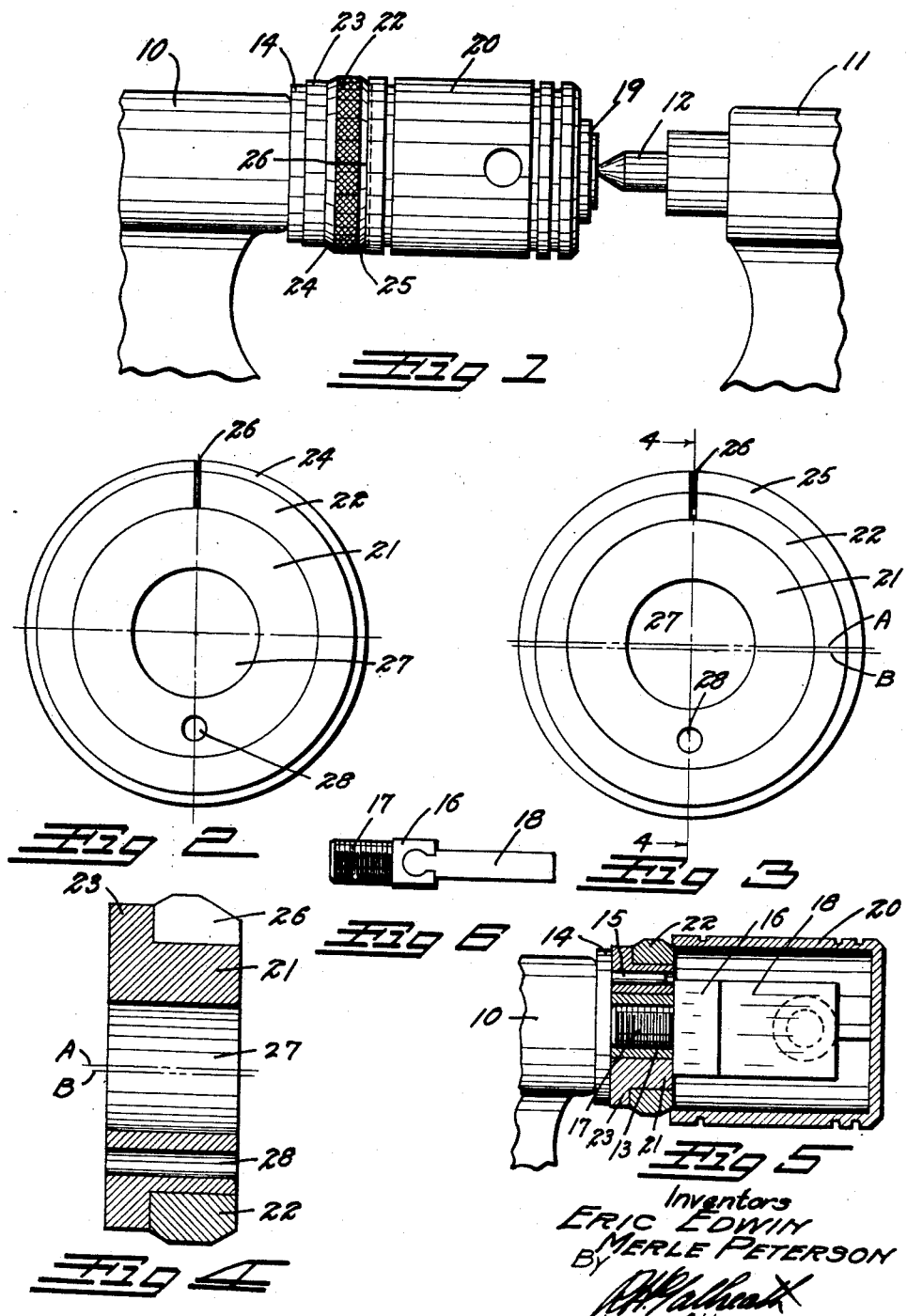

ECCENTRIC HEAD FOR CAM GRINDING PISTONS

Eric Edwin and Merle Peterson, Denver, Colo.

Application March 7, 1939, Serial No. 260,278

5 Claims. (Cl. 82—40)

This invention relates to a chuck for supporting the skirt of a piston in a piston grinding machine. The pistons in modern automotive engines are ground to an oval shape to accommodate for the unequal heat expansion therein. The standard grinding machine however is designed only for the cylindrical grinding and cannot be used for oval or "cam-grinding."

The principal object of this invention is to provide a chuck which can be placed on a standard grinding machine to replace the standard chuck thereon which will adapt the machine for cam grinding when desired and yet which will not interfere with the use of the machine for concentric cylindrical grinding.

Other objects are: to provide a chuck which will allow the axis of eccentricity to be adjusted to any desired position on the piston; which will require no changes to be made in the grinder mechanism; which will eliminate the cams, slides, and rods used in the usual cam grinding machine; and which can be replaced or removed without the use of tools.

Other objects and advantages reside in the detailed construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the improved chuck supporting a piston on the usual grinding machine.

Fig. 2 is a face view of the chuck arranged for cylindrical grinding.

Fig. 3 is a similar view of the chuck arranged for cam grinding.

Fig. 4 is a cross section through the improved chuck taken on the line 4—4, Fig. 3.

Fig. 5 is a vertical section through the improved chuck and piston in place on the usual grinding head.

Fig. 6 is a detail view illustrating a type of key which may be used for causing the piston to rotate with the chuck.

In the drawing, typical parts of a standard grinding machine are designated by numerals as follows: head stock 10, tail stock 11, dead center 12, power shaft 13, power shaft chuck flange 14, flange pin 15, key dog 16, and key 18. A typical piston is illustrated at 20.

The invention is more particularly designed for use with an eccentric dead center device 19 which is fully illustrated and described in applicant's co-pending application, Serial No. 259,364. It is, however, not limited to use with this particular device.

In the standard grinding machine, a tapered one piece chuck is slid over the extremity of the shaft 13 and over the pin 15 to receive the hollow skirt end of the piston 20. To apply this invention, this chuck is slid from place and replaced by the improved chuck.

The improved chuck is formed in two pieces, a hub member 21, and an annular ring 22. The hub member is formed with a back flange 23. The ring is slidably fitted to the hub member 21 and rests against the back flange 23. The hub member 21 has a shaft opening 27 for receiving the power shaft 13 and with a pin hole 28 for receiving the pin 15.

The peripheral edge of each face of the ring 22 is beveled to form conical tapered surfaces 24 and 25. The surface 24 is concentric with the ring axis, as shown in Fig. 2, and the surface 25 is eccentric therewith, as indicated by the offset center lines "A" and "B" in Fig. 3. When in use, the skirt of the piston 20 engages one or the other of these surfaces depending upon which face of the ring is turned outwardly.

If the skirt is in engagement with the tapered surface 24 the piston will rotate concentrically and if the ring be removed and reversed so as to present the tapered surface 25 to the piston, the latter will rotate or gyrate eccentrically. The piston skirt is held against the surfaces by the pressure of the dead center point 12, and it is rotated with the chuck by means of the usual key dog 16 and key 18 which engages the wrist pin bosses in the piston as is usual in piston grinding practice.

The axis of eccentricity can be positioned at any desired side by rotation of the ring 22. The friction of the ring against the flange 23 prevents rotation of the ring on the hub member when under the pressure of the center 12.

The ring 22 may be split, as shown at 26, so that when the piston skirt is forced upon the tapered surface, it will act to contract the ring about the hub portion to firmly grip the latter.

The grinding is carried on as usual with a round piston. More metal will be ground away on one side of the axis than the other, however, due to the eccentric position of the piston.

Upon completion of this side, the ring is given a one-half turn whereby the piston is made eccentric the same amount on the other side of the axis. Grinding is resumed and the final result is an oval shaped or cam ground piston.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A chuck for supporting a piston on the shaft of a grinding machine comprising: a hub member; a flange surrounding said hub member adjacent one face thereof; an annular ring surrounding said hub member and lying against said flange; and a tapered surface about said ring for receiving the skirt of said piston, the axis of said tapered surface being eccentric of the axis of said ring.

2. A chuck for supporting a piston on the shaft of a grinding machine comprising: a hub member; a flange surrounding said hub member adjacent one face thereof; an annular ring surrounding said hub member and lying against said flange; and a tapered peripheral surface at each face of said ring, one of said surfaces being concentric with the axis of said ring, the other surface being eccentric of said axis.

3. A chuck for supporting a piston eccentrically on the head stock of a grinding machine comprising: a piston supporting member; means for mounting said member on the power shaft of said machine; and a frusto-conical, external surface on said member for receiving the skirt of said piston, the axis of said surface being eccentric of the axis of said shaft.

4. A chuck for supporting work on the shaft of a grinding machine comprising: a concentric hub member; a back flange surrounding said hub member; a rotatable annular ring surrounding said hub member and lying against said flange; and a conical peripheral edge on said ring to receive the work, the axis of said conical peripheral edge being concentric of the axis of said hub member.

5. A chuck for supporting work on the shaft of a grinding machine comprising: a concentric hub member; a back flange surrounding said hub member; a split rotatable annular ring surrounding said hub member and lying against said flange; and a conical peripheral edge on said ring to receive the work, the axis of said conical peripheral edge being eccentric of the axis of said hub member.

ERIC EDWIN.
MERLE PETERSON.